(12) United States Patent
Major

(10) Patent No.: US 6,452,108 B1
(45) Date of Patent: Sep. 17, 2002

(54) CABLE HOUSING DEVICE

(75) Inventor: John Major, Dubai (AE)

(73) Assignee: Major Enterprises Limited, Douglas (GB)

( * ) Notice: Subject to any disclaimer, the term of this patent is extended or adjusted under 35 U.S.C. 154(b) by 0 days.

(21) Appl. No.: 09/530,115

(22) PCT Filed: Oct. 26, 1998

(86) PCT No.: PCT/GB98/03223
§ 371 (c)(1),
(2), (4) Date: Apr. 21, 2000

(87) PCT Pub. No.: WO99/22427
PCT Pub. Date: May 6, 1999

(30) Foreign Application Priority Data

Oct. 24, 1997 (IE) .............................................. S970768

(51) Int. Cl.$^7$ .............................................. H02G 11/02
(52) U.S. Cl. ............................. 174/135; 174/50; 174/48
(58) Field of Search ........................... 174/135, 48, 50, 174/17 R, 53, 57; 379/438, 437; 439/4, 52.8; 191/12.4, 12.2 R, 12 R

(56) References Cited

U.S. PATENT DOCUMENTS

| | | | | | |
|---|---|---|---|---|---|
| 3,815,078 | A | * | 6/1974 | Fedrick | 339/28 R |
| 4,282,954 | A | * | 8/1981 | Hill | 191/12.4 |
| D282,359 | S | * | 1/1986 | Schwartz | D14/53 |
| 5,575,668 | A | * | 11/1996 | Timmerman | 439/131 |
| 6,184,461 | B1 | * | 2/2001 | Flegel | 174/50 |
| 6,253,893 | B1 | * | 7/2001 | Chi-Min | 174/113 R |
| 6,276,502 | B1 | * | 8/2001 | Leyba et al. | 174/117 F |

* cited by examiner

Primary Examiner—Chau N. Nguyen
Assistant Examiner—Angel R. Estrada

(57) ABSTRACT

A cable housing device (10) comprises a housing (1) which comprises outer and inner sub-housings (11 and 12). The inner sub-housing (12) provides a hub upon which an electric cable (500) can be releasably wound in a uniplanar manner. A combined handle and electrical socket piece (300) pivotally mounted in a central, semi-circular hole through the sub-housing (12) is turnable from the plane of the housing (1) to a plane perpendicular thereto to reveal two socket holes (321 and 322) to receive a two-pin plug and to enable the piece (300) to be rotated to rotate the sub-housing (12) in the sub-housing (11) in order to wind-on the cable (500).

16 Claims, 8 Drawing Sheets

CABLE HOUSING DEVICE

BACKGROUND OF THE INVENTION

This invention relates to a cable housing device. In particular, it relates to a cable housing device for use by a traveller.

DESCRIPTION OF THE PRIOR ART

Cable housing devices are known which have many different shapes and sizes. Generally speaking such known housing devices are designed to enable an electric cable to be wound on to a drum (so as to keep the cable neat and tidy when not in use) and to enable the cable to be unwound so as to provide electrical connection from an electrical socket to an electrically operated device situated at such a distance from the socket that the cable of the device is of insufficient length.

U.S. Pat. No. 4,282,954 discloses a hand reel for use in winding an electrical extension cord and comprises a central casing having a grip handle portion extending outwardly from an upper end thereof. The cord is wound within the casing on a spool which is comprised of hub portions mounted at opposing sides of the casing and rotatable relative to the casing. The hubs join together within the casing along mating surfaces integrally formed on the hubs. Cap elements are provided along the exterior surfaces of the hubs at opposed ends of the spool, each cap element defining an orifice in which is mounted by means of springs or clamps an electrical receptacle connected with an interior end of the cord housed in the spool. Handles are provided on the hubs and extending outwardly from the outer surface of the hubs to allow rotation of the spool relative to the casing.

Heretofore, a traveller bringing an electrical device such as a hair dryer or laptop computer to a hotel or the like and wishing to use such a device would be required, in those situations where the electrical socket was too far away from the desired location of use of the device, either, but not exclusively, to (a) not use the device; (b) borrow a cable from the management of the establishment, (c) bring the device nearer to the electrical socket and suffer the inconveniences of not being able to use the device at the desired location; or (d) bring an extension lead.

The option which provides the traveller with the greatest independence is the bringing of an extension lead. However, heretofore, the disadvantage of such an extension lead was that, if not contained in a housing, it was annoying in that it could become tangled; and if within a housing, it was generally cumbersome and unnecessarily heavy.

It is an object of the present invention to overcome these problems by providing a suitable cable housing device.

SUMMARY OF THE INVENTION

According to one aspect of the present invention, there is provided a cable housing device for releasably storing an electric cable, comprising a housing which extends in a first plane and which comprises a first sub-housing and a second sub-housing around which the first sub-housing extends; the second sub-housing comprising hub means upon which the cable can be releasably wound; the first sub-housing and the second sub-housing being operatively associated with each other such that the second sub-housing is capable of rotational movement relative to the first sub-housing; and an electrical terminal piece movable between a first condition wherein the piece extends in said plane and a second condition in which the piece extends in a second plane transverse to said first plane, said piece, when in use, being in electrical connection with one end of the cable.

Owing to this aspect of the invention, the socket unit can be employed as a handle for rotating the second sub-housing and/or, in the case of a socket unit designed to receive a two-pin plug, the maximum thickness of the housing need not be determined by the minimum necessary length of the sockets themselves.

According to a second aspect of the present invention, there is provided a cable housing device for releasably storing an electric cable, comprising a housing which extends in a first plane and which comprises a first sub-housing and a second sub-housing around which the first sub-housing extends; the second sub-housing comprising hub means upon which the cable can be releasably wound; the first sub-housing and the second sub-housing being operatively associated with each other such that the second sub-housing is capable of rotational movement relative to the first sub-housing; and a handle movable between a first condition wherein the handle extends in said plane and a second condition in which the handle extends in a second plane transverse to said first plane, said handle, when in said second condition, being usable to rotate the second sub-housing relative to the first sub-housing.

Owing to this aspect of the invention, the handle need not project from the device during transport of the device.

According to a third aspect of the present invention, there is provided a cable housing device for releasably storing an electric cable, comprising a housing which extends in a first plane and which comprises a first sub-housing and a second sub-housing around which the first sub-housing extends; the second sub-housing comprising hub means upon which the cable can be releasably wound; the first sub-housing and the second sub-housing being operatively associated with each other such that the second sub-housing is capable of rotational movement relative to the first sub-housing; said hub means comprising end plates at respective axial ends of said hub means and the distance between the end plates being just greater than the diameter of the cable, thereby enabling the wound cable to be uniplanar within the device.

Owing to this aspect of the invention, the cable winds and unwinds without jamming and the housing can be thinner than if the cable were to be wound in a multi-planar manner.

A preferred embodiment of the invention is a cable housing device for releasably storing an electric cable which device comprises a housing comprising a first sub-housing and a second sub-housing; the second sub-housing comprising a hub top and a hub bottom; the first sub-housing and the second sub-housing being operatively associated with each other such that the second sub-housing is capable of rotational movement relative to the first sub-housing; the hub top or hub bottom or both having means for enabling an electrical cable to be releasably wound thereon; and means for rotating the sub-housings relative to each other, the distance between the hub top and the hub bottom being just greater than the diameter of the cable, thereby enabling the wound cable to be uniplanar within the device; the hub top or the hub bottom or both having the rotating means in the form of a handle; the handle being movable between a first condition wherein the handle is substantially co-planar relative to the hub top or hub bottom, as the case may be; and a second condition in which the handle is positioned transverse to the plane of the wound cable.

Preferably, the handle incorporates an electrical socket means which, when in use, is in electrical connection with one end of the cable. Bringing of the handle to its second condition enables (a) the cable to be wound back onto the hub or (b) an electrical plug to be inserted into the socket means.

Preferably, the first sub-housing has an opening for enabling the cable to pass therethrough externally of the housing.

Preferably, the device is of about the same plan size as A4 paper and is as thin and flat as possible, so that it readily and slimly fits into most bags and cases used by businessmen when travelling.

BRIEF DESCRIPTION OF THE DRAWINGS

The invention will be understood in greater detail from the following description of a preferred embodiment thereof given by way of example only and with reference to the accompanying drawings, in which.

DETAILED DESCRIPTION OF THE DRAWINGS

Referring now to FIGS. 1 to 8, there is shown a cable housing device 10 including a housing 1 which comprises a first sub-housing 11 and a second sub-housing 12.

Figure 1:
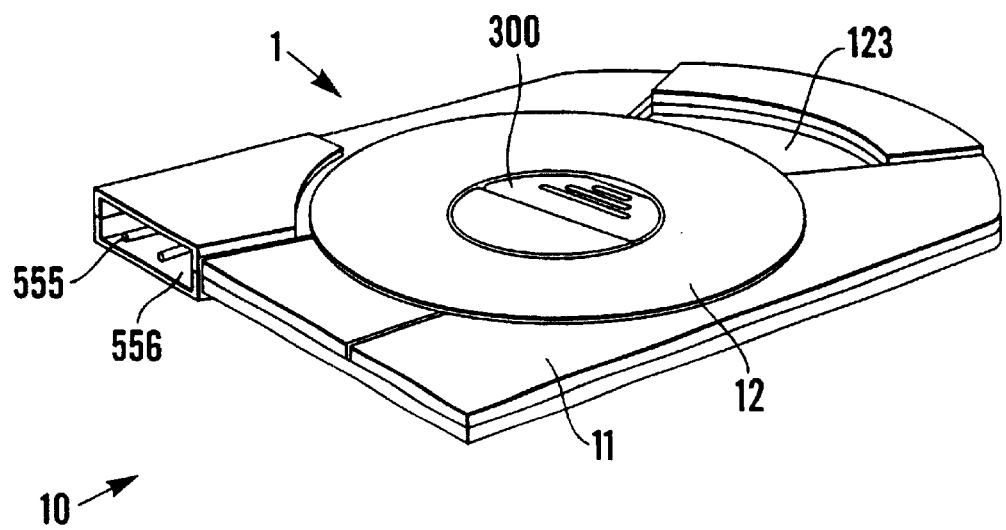
FIGS. 1 to 4 are perspective views of a cable housing device in different conditions.
Figure 2:
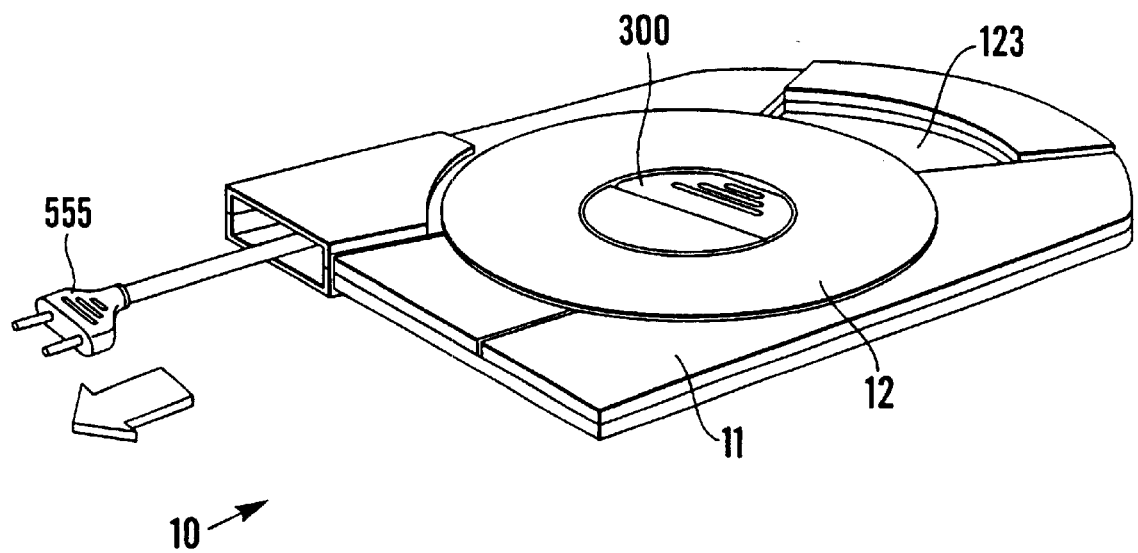
Figure 3:
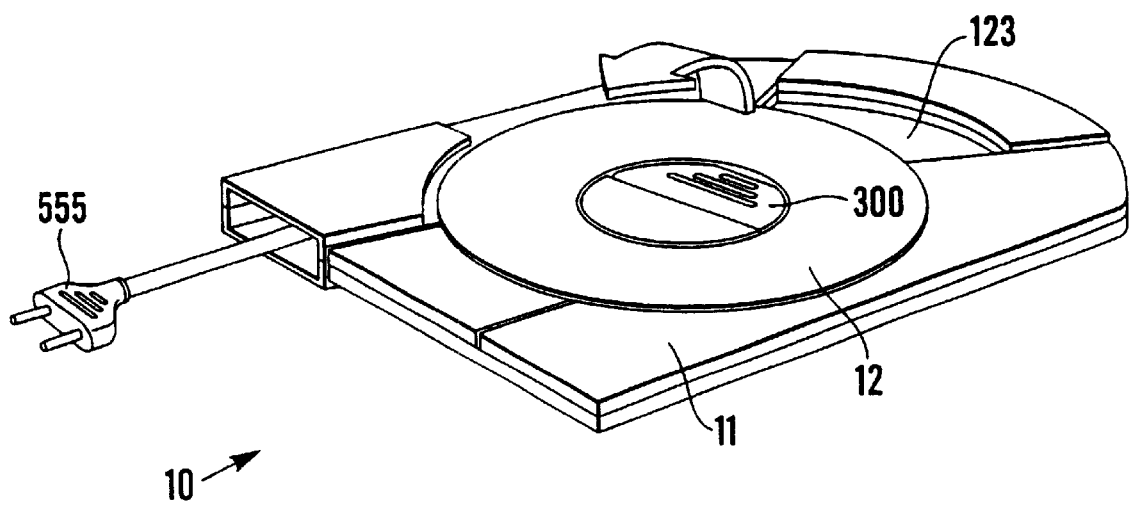
Figure 4:
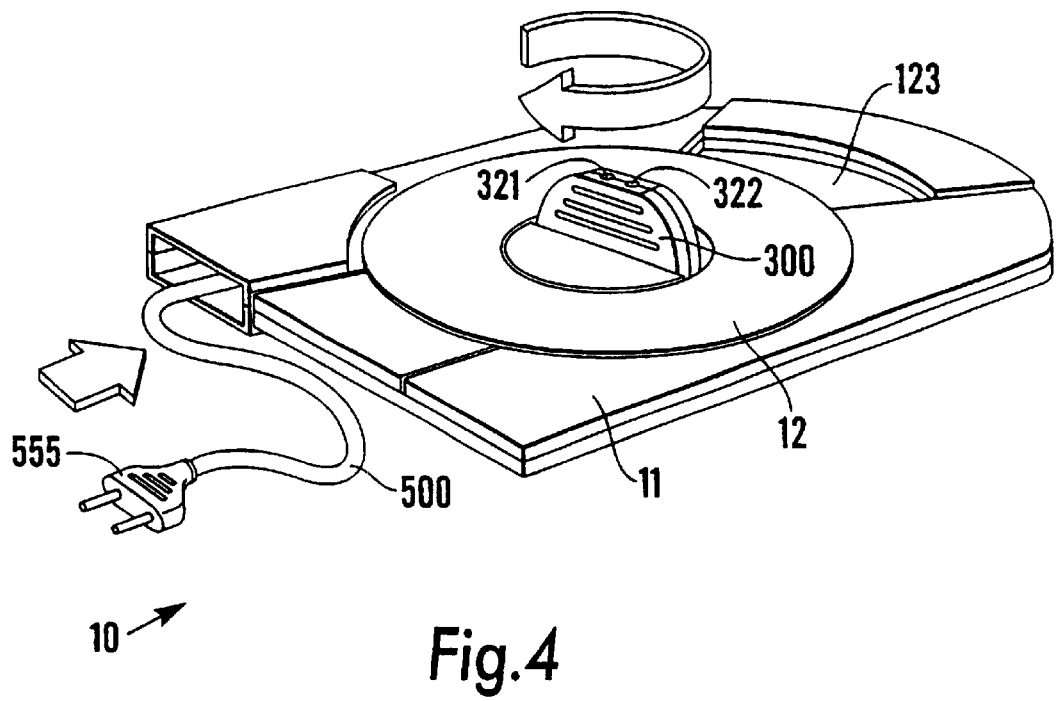
Figure 5:
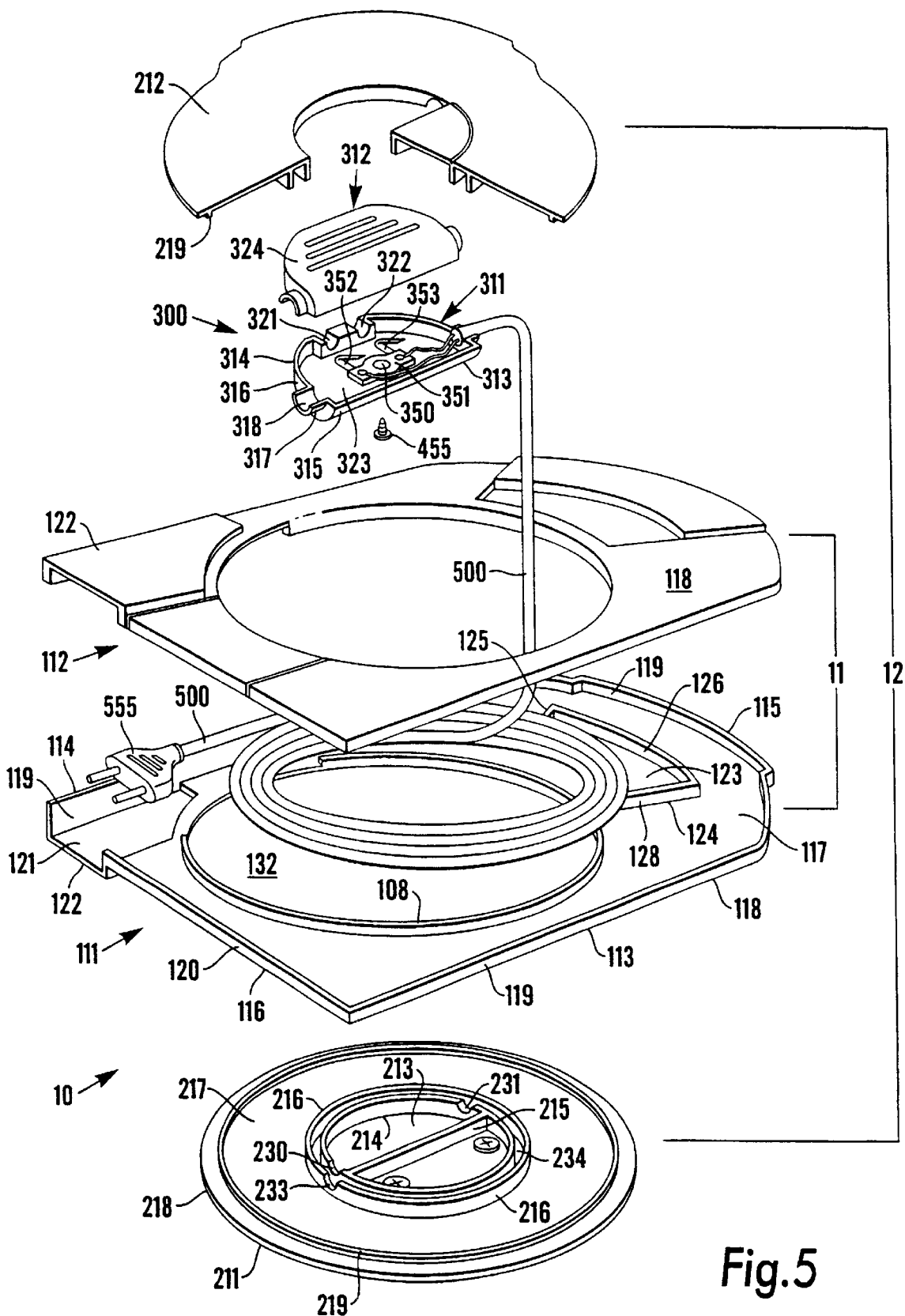
FIG. 5 is an exploded view of the device.

With particular reference to FIG. 5, the first sub-housing 11 comprises a first element 111 and a second element 112. Each of the elements 111 and 112 is a mirror image of the other and thus it is only necessary to describe the first element 111. Thus, the first element 111 is substantially rectangular in shape having opposing sides 113 and 114, opposing ends 115 and 116, an internal face 117 and an external face 118. Around the sides 113 and 114 and the end 115, there is provided a continuous lip 119 having a predetermined height X. The end 116 has a similar lip 120 which is contiguous with the lip 119 of the side 113 but is discontinuous with respect to the lip 119 of the side 114. At this discontinuity, the internal face 117 is provided with a depression 121 resulting in a protuberance 122 at the external face 118.

The first element 111 is provided with an opening 132 and an aperture 123. The opening 132, which is located substantially centrally of the first element 111, is substantially circular in shape and also has a circumferentially disposed lip 108 except in the vicinity of the depression 121. The end 115 is arcuate in shape primarily for aesthetic reasons.

The aperture 123 is located between the opening 132 and the end 115. The aperture 122 has opposing sides 124 and 125 and opposing ends 126 and 127. The ends 126 and 127 are each arcuate in shape primarily for aesthetic reasons, and, if desired, may be concentric relative to each other and the first opening 132. The length of the arcuate end 127 is less than that of the end 126. Thus, the sides 124 and 125 are non-parallel relative to each other and diverging relative to the centre of the opening 132. A continuous lip 128 is provided on the sides 124 and 125 and the ends 126 and 127.

Like the lips 119 and 120, the lip 128 projects from the internal face 117 by the distance X.

The second sub-housing 12 comprises a hub bottom or first element 211 and a hub top or second element 212. Each of the elements 211 and 212 is a mirror image of the other and thus it is only necessary to describe the first element 211.

Thus, the first element 211 is substantially circular in shape having an internal face 217 and an external face 218. Projecting from the internal face 217 is a circumferentially disposed lip 219. The lip 219 has a radius of a few millimetres less than the radius of the first element 211. The height of the lip 219 is such that, when the first element 211 and the second element 212 are in co-operating arrangement (described below), the lips 219 do not touch but rather leave a gap therebetween which is slightly wider than the diameter of the cable 500 to be used in the device 10.

Located centrally of the first element 211 is a semi-circular opening 213. The arcuate side of the opening 213 is provided with a lip 214 the height of which is slightly greater than the height X of the lips 119 and 120. The lip 214 extends beyond the linear side of the opening 213 to provide a circular lip 214. The linear side of the opening 213 is also provided with a lip 215 of similar height to the lip 214. Concentric with the lip 214 is a lip 216 which has the same height as the lip 214. The lip 216 is located between the lip 219 and the lip 214 such that the width of the thus created channel 234 between the lips 214 and 216 is slightly greater than the diameter of the cable 500.

The lip 214 is provided with two diametrically opposed recesses 230 and 231; the lip 216 is provided with a recess 233. The recesses 230 to 233 are each semi-circular.

A handle 300 is also provided. The handle 300 comprises a first element 311 and a second element 312. Each of the elements 311 and 312 is a mirror image of the other and thus it is only necessary to describe the first element 311.

The first element 311 has a shape and configuration designed to fit neatly into the semi-circular opening 213. The first element 311 has a linear side 313 and a substantially arcuate side 314. An unbroken lip 315 is provided along the side 313; a discontinuous lip 316 having the same height as the lip 315 is provided on the arcuate side 314. Thus, in notionally traversing the lip 316 starting at one edge of the lip 315, initially, the lip 316 is contiguous with the lip 315; then the lip 316 projects laterally from the arcuate side 314 and terminates. The lip 316 recommences again in mirror image fashion thereby providing a semi-cylindrical, externally disposed surface 317 matched by an internal channel 318. A similar arrangement pertains on the opposing side of the first element 311 to provide a surface 319 and a channel 320 corresponding respectively to the surface 317 and the channel 318. The arcuate side 314 has a first curved recess 321 and a second curved recess 322. The element 311 has an internal face 323 and an external face 324. The description which now follows with respect to the handle 300 is relevant only to the first element 311.

Thus, the first element 311 is provided with an opening 350. Suitably mounted on the internal face 323 by means well known per se is an electronically non-conductive element 351 having an opening in register with the opening 350. The element 351 has a pair of electronically conductive elements 352 and 353 mounted thereon of a type well known per se. These elements 352 and 353 are each substantially U-shaped and disposed in a manner to enable the respective electrically conductive pins 453 and 454 of a plug 400 to be in secure and releasable electrical contact therewith as described below.

The internal face 323 of the second element 312 has a screw thread engaging projection such that when the elements 311 and 312 are in mating arrangement (to be described below) a screw 455 may serve to secure the elements 311 and 312 together.

The device 10 is designed for use with a cable 500 having an electrical rating suitable for the electrical power requirements of the electrical device types to be used therewith. Thus, the cable 500 need not have a diameter greater than necessary. One end 501 of the cable 500 has a bare pair of wires which are electrically connected respectively to the elements 352 and 353. The other end 502 of the cable 500 may be provided with an electrical plug 555.

With the wires of the end 501 (see FIG. 8) electrically connected in place on respective elements 352 and 353, the cable 500 is fed therefrom and allowed to rest in the channel 315. The elements 311, 312 are now joined together using the screw 455 to provide the handle 300.

The element 211 is placed on a surface and the first element 111 is placed over it so that the lip 219 and the lip 108 are side touching in such a manner as to enable the element 211 to rotate relative to the element 111.

The handle 300 is placed in the opening 213 of the element 211 such that the surface 317 rests in the recess 230. The opposite surface 319 rests in the recess 231. The cable 300 is now fed into the channel 234 until it reaches the recess 233 from which it emerges. The element 112 is now placed over the element 111 to provide the first sub-housing 11. Finally, the element 212 is offered to the element 211 thereby completing the assembly of the device 10. The various components of the device 10 may be held together by conventional means such as screws and suitable bores therefor.

The arrangement is such that the second sub-housing 12 can rotate relative to the first sub-housing 11; whilst handle 300 can turn relative to the second sub-housing 12 from the plane of the housing 1 into a plane perpendicular to the plane of the housing (see FIGS. 1 to 4). Thus, in order to wind the cable 500 into the device 10, the handle 300 is turned (see FIGS. 3 and 4) so as to be perpendicular to the second sub-housing 12 and then the handle is rotated to rotate the second sub-housing 12 relative to the first sub-housing 11, thereby causing the cable 500 to be wound onto the combined lips 216 of the elements 211 and 212. In essence, therefore, the two lips 216 of the assembled device 10 provide a hub on which to wind the cable 500. However, because of the combined height of the lips 216, which is just slightly greater than the diameter, i.e. thickness, of the cable 500, the cable 500 winds initially around the combined lips 216 and subsequently around itself in coil-like fashion and in one-and-the-same plane. The length of the cable 500 is such that, when fully wound, the electrical plug 555 is housed in the opening 556 generated by the recesses 121. The handle 300 may now be turned back to assume the condition shown in FIGS. 1 to 3. The device 10 now appears in the condition shown in FIG. 1 in which there is provided a relatively thin-sided device 10 for containing a relatively long cable 500 and its associated electrical plug 555. The aperture 123 provides a hand grip facility for enabling the device 10 to be carried with ease. When it is desired to use the cable 500, the plug 555 is pulled from the opening 556, thereby causing the second sub-housing 12 to rotate relative to the first sub-housing 11 (see FIG. 2). When sufficient cable 500, or all of the possible amount of cable 500, has been pulled free from the device 10, the handle device 300 is turned, thereby enabling a second electrical plug 400 of, for example, a laptop computer, to be plugged into what is now an electrical socket piece 300. As will be observed particularly from FIG. 8, when the plug 400 is in engagement with the handle 300, its pins 453 and 454 are in electrical contact with the respective electrically conductive elements 352 and 353. The plug 555 is inserted into an electrical socket.

When the device 10 is no longer required, the plug 400 is removed, and the handle 300 and thus the second sub-housing 12 are rotated relative to the first sub-housing 11 so as to wind the cable 500 into the device 10 until the plug 555 is housed in the opening 556.

There is thus provided a neat, slim and easy-to-use cable extension device 10 having particular suitability for a traveller.

Figure 6:
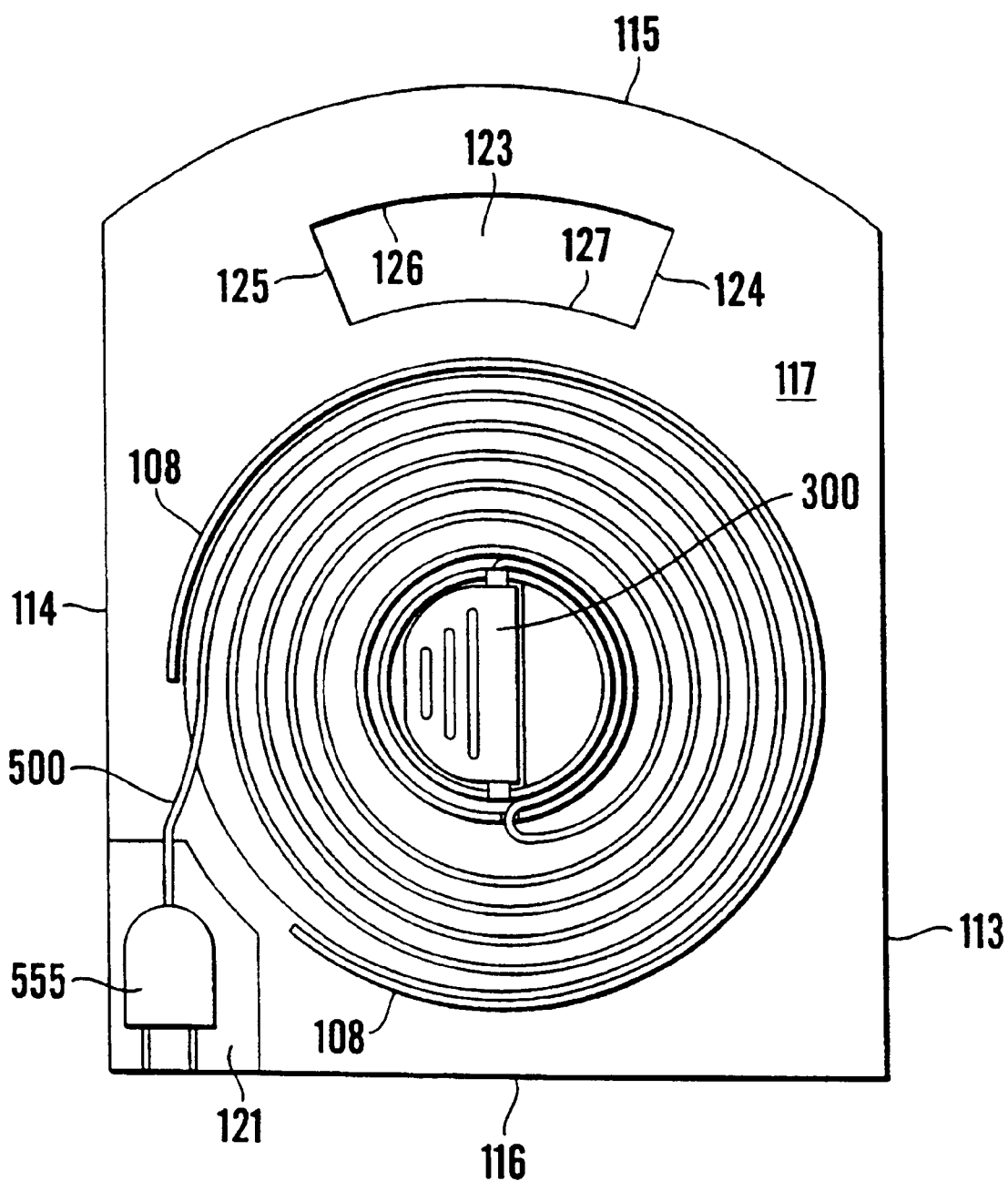
FIGS. 6 and 7 are top plan views of the inside of the device with lots of cable therein and less cable therein, respectively.
Figure 7:
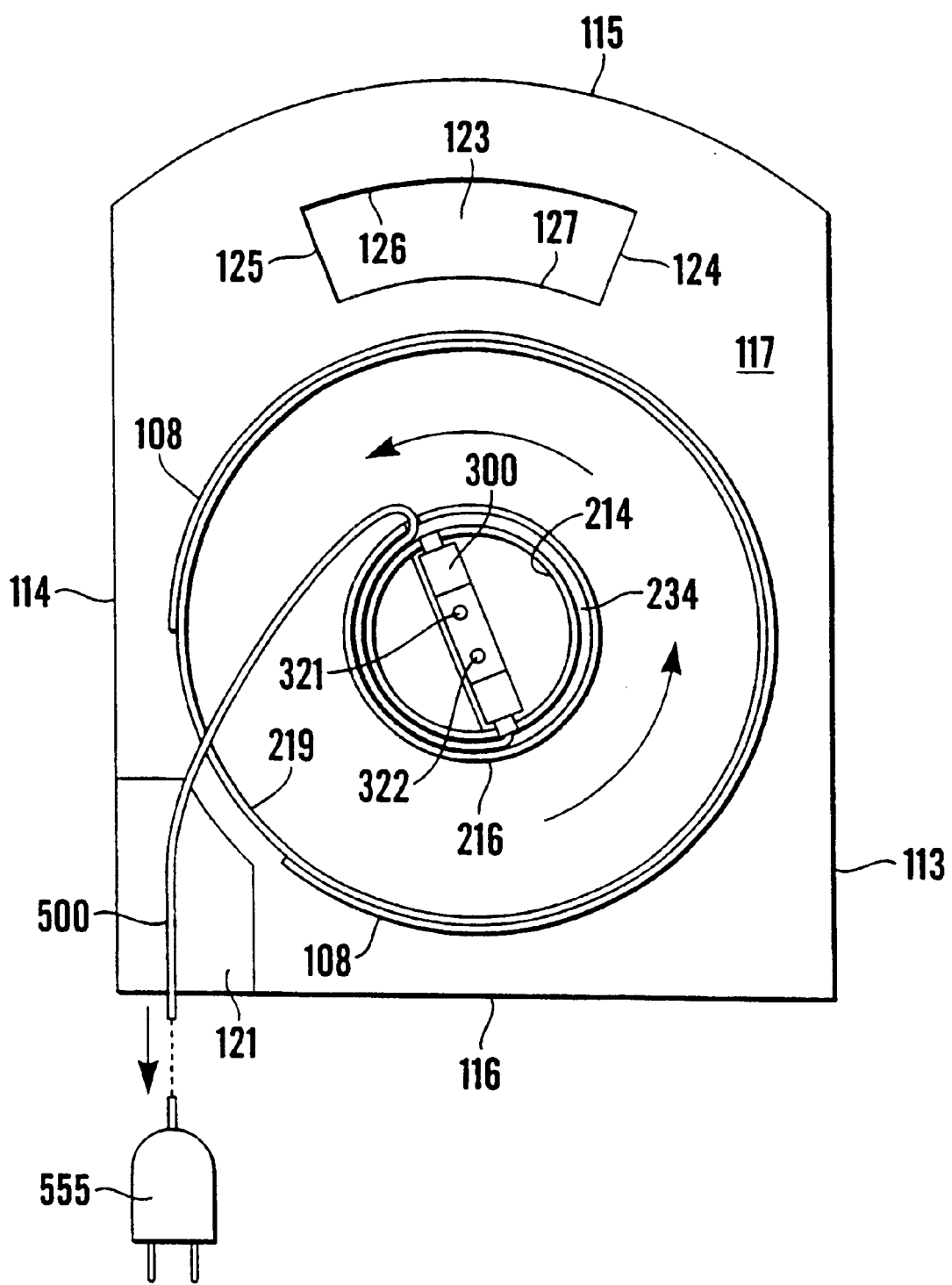
Figure 8:
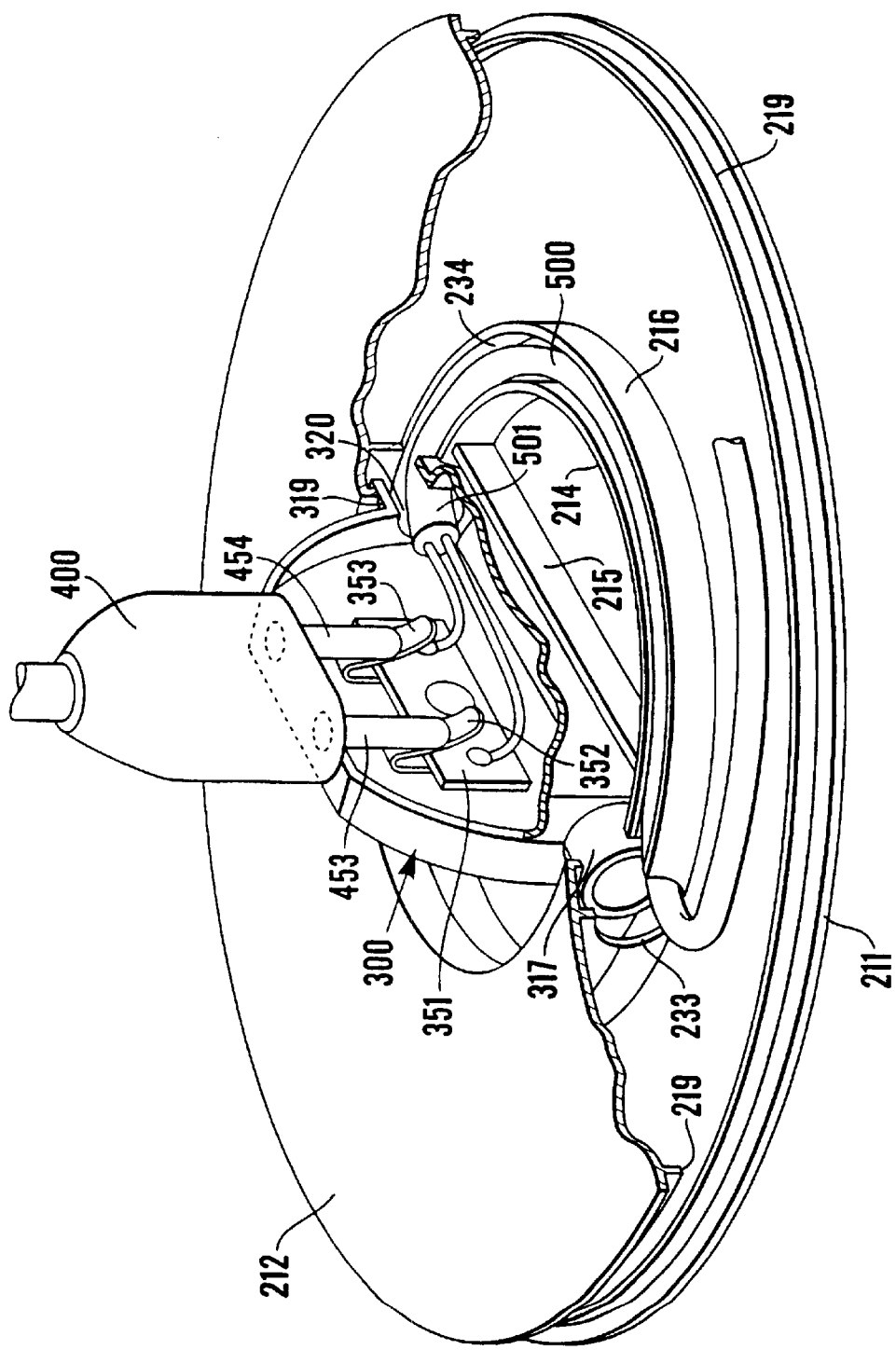
FIG. 8 is a fragmentary, enlarged, perspective view of part of the device showing an electrical plug in place therein.

With reference to FIGS. 6 and 7 of the drawings, it will be observed that the cable 500 is wound in anti-clockwise fashion. It will be appreciated that, if the cable 500 were to be wound in clockwise fashion, the bend in the cable 500 where it emerges from the channel 234 would not be present. In addition, instead of providing the various elements (including the elements 352 and 353) in the handle 300 for enabling the electrical plug 400 to be inserted therein, the various elements may be provided elsewhere in the device 10.

It will be appreciated that the handle 300 could incorporate additional electrical connections of the type already described so as to accommodate more than one plug 400.

Figure 9:
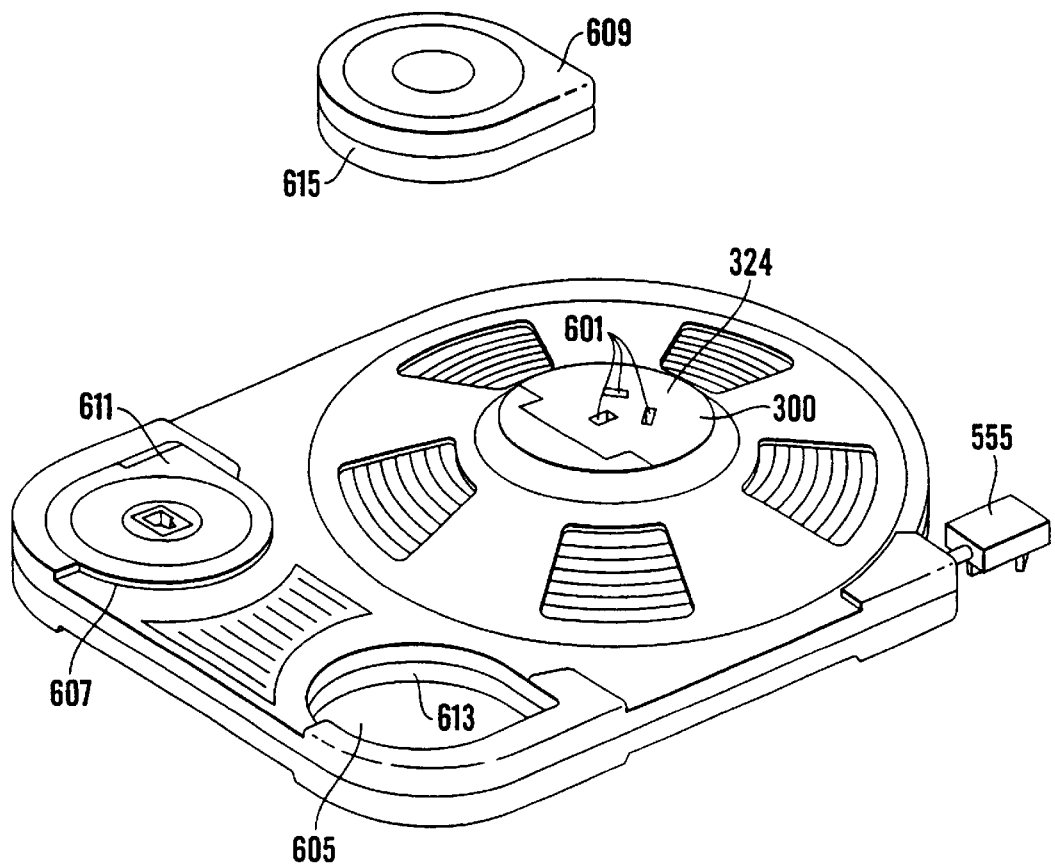
FIG. 9 is a perspective view of a modified version of the cable housing device, with a MODEM extension device and a box, and intended particularly for portable computer users who travel a great deal.
Figure 10:
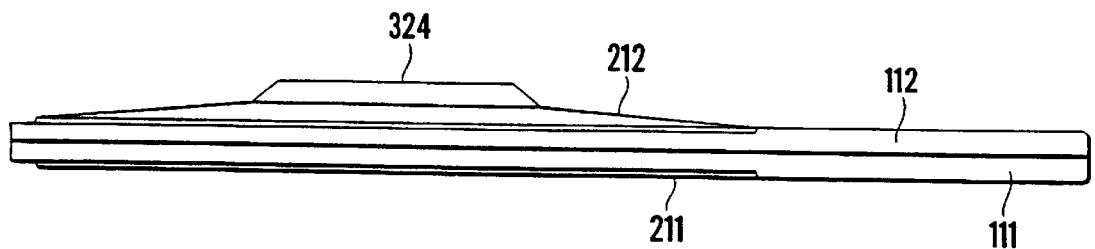
FIG. 10 is a side elevation of the modified version.
Figure 11:
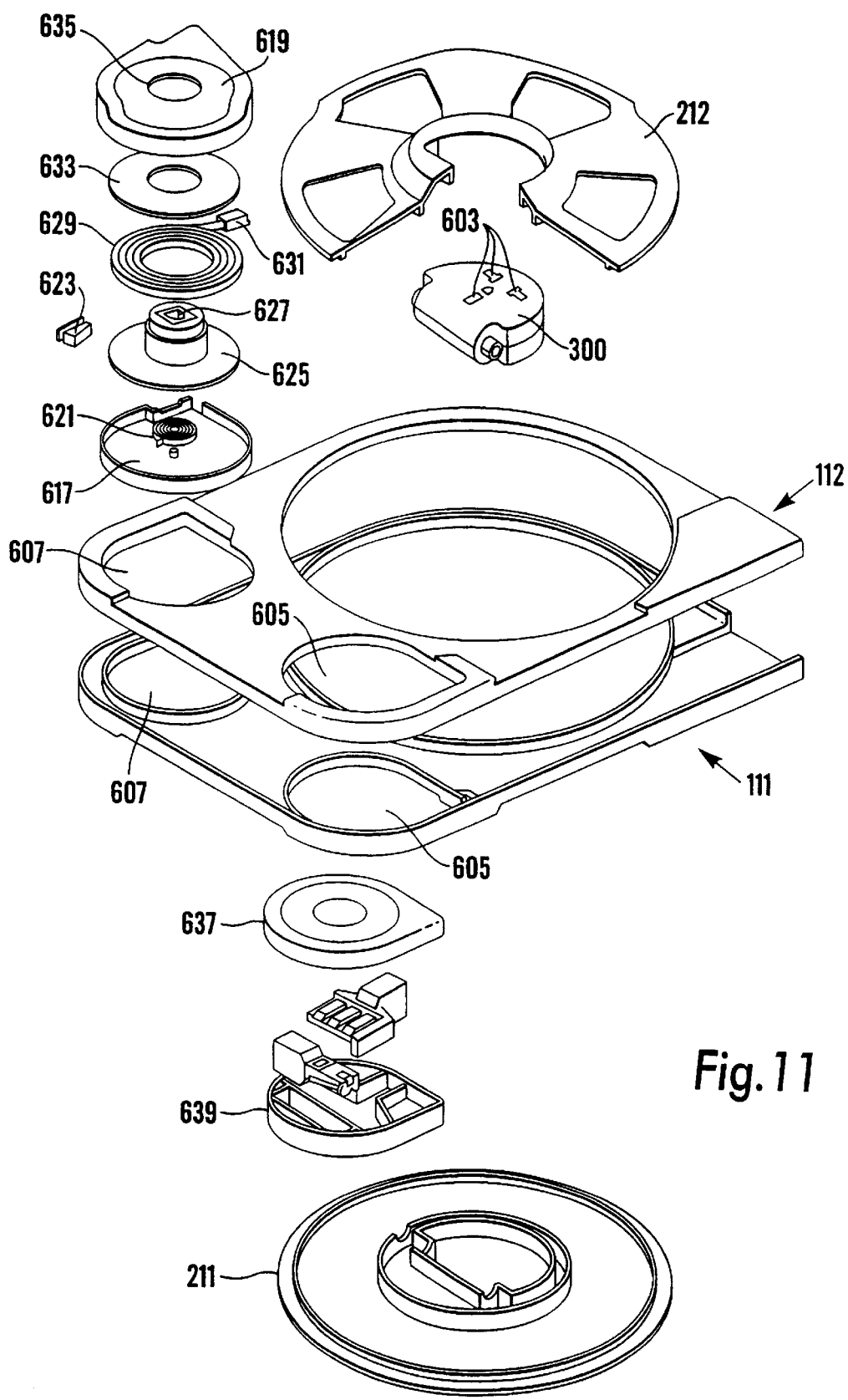
FIG. 11 is a view similar to FIG. 9 but exploded and with the cable omitted.

The version shown in FIGS. 9 to 11 differs from that shown in FIGS. 1 to 8 in the following respects mainly. Firstly, in addition to or instead of the socket holes 321 and 322 in an outer edge face of the handle 300, there may be socket holes in one of the major faces 324 of the handle 300; for example, there may be three socket holes 601 as in FIG. 9 suitable for the standard Australasian terminal arrangement or 603 as in FIG. 11 suitable for both the standard British and the standard Continental European terminal arrangements. Secondly, instead of the hand grip aperture 123, there are provided, on the outside surfaces of the elements 111 and 112, lined finger/thumb grips 604. Thirdly, there are provided two apertures 605 and 607 to receive a box 609 and a MODEM extension device 611, respectively. The peripheral surface 613 of each of the apertures 605 and 607 and the peripheral surface 615 of each of the devices 609 and 611 is so formed as to provide a snap-fit, snap-release action for each of the devices 609 and 611. Fourthly, the electrical plug 555 is a three-pin plug which is too deep to retract fully into the housing 1.

The box 609 includes two dished casing elements 637 and 639 which are a mirror image of each other and are readily detachable from each other to open the box. The latter holds a number of telephone/MODEM adaptors to allow a computer user to adapt easily to local telephone sockets.

The MODEM extension device 611 includes two dished casing elements 617 and 619 which are a mirror image of each other. Mounted in the element 617 is a return coil spring 621 activatable by a pushbutton 623. The spring 621 is received inside a top-hat member 625 formed with a socket 627 for a MODEM lead plug (not shown) and providing a hub on which is wound a MODEM extension lead 629 electrically connected to the socket 627 and fitted with a plug 631. The lead 629 is retained on the hub by an annular plate 633. The socketed end of the hub is received in a central hole 635 in the element 619.

I claim:

1. A cable housing device for releasably storing an electric cable, comprising a housing which extends in a first plane and which comprises a first sub-housing and a second sub-housing around which the first sub-housing extends; the second sub-housing comprising hub means upon which the cable can be releasably wound; the first sub-housing and the second sub-housing being operatively associated with each other such that the second sub-housing is capable of rotational movement relative to the first sub-housing; and an electrical terminal piece movable between a first condition wherein the piece extends in said plane and a second condition in which the piece extends in a second plane transverse to said first plane, said piece, when in use, being in electrical connection with one end of the cable.

2. A device according to claim 1, wherein said piece, when in said second condition, is usable as a handle for rotating the second sub-housing relative to the first sub-housing.

3. A device according to claim 1, wherein said hub means comprises end plates at respective axial ends of said hub means and wherein the distance between the end plates is just greater than the diameter of the cable, thereby enabling the wound cable to be uniplanar within the device.

4. A device according to claim 1, wherein said piece is an electrical socket piece having electrical socket holes into which pins of an electrical plug are insertable.

5. A device according to claim 4, wherein said socket holes are substantially hidden in said first condition and exposed in said second condition.

6. A device according to claim 5, wherein said socket holes are a pair of socket holes for a two-pin plug.

7. A device according to claim 4, wherein said socket holes are exposed in said first condition and substantially exposed in said second condition.

8. A device according to claim 7, wherein said socket holes are three in number for a three-pin plug.

9. A device according to claim 1, wherein said piece is movable as aforesaid by turning about a pivot extending substantially in said first plane.

10. A device according to claim 1, wherein said piece is of the shape of substantially a segment of a circle when viewed perpendicularly to said first plane.

11. A device according to claim 1, wherein said cable extends through the first sub-housing, and the first sub-housing has an opening for enabling the cable to pass therethrough to externally of the housing.

12. A device according to claim 1, wherein said first sub-housing has first and second edges at respective opposite sides of said second sub-housing and an aperture is formed through said first sub-housing transversely of said first plane and at a location between said first and second edges to provide a hand grip at the outer periphery of the first sub-housing.

13. A device according to claim 1, wherein said first sub-housing is formed, between its inner and outer peripheries, with one or more annular surfaces bounding holding spaces for one or more other devices.

14. A device according to claim 13, wherein said one or more other devices are a MODEM extension device and/or a box containing telephone/MODEM adaptors.

15. A cable housing device for releasably storing an electric cable, comprising a housing which extends in a first plane and which comprises a first sub-housing and a second sub-housing around which the first sub-housing extends; the second sub-housing comprising hub means upon which the cable can be releasably wound; the first sub-housing and the second sub-housing being operatively associated with each other such that the second sub-housing is capable of rotational movement relative to the first sub-housing, and a handle movable between a first condition wherein the handle extends in said plane and a second condition in which the handle extends in a second plane transverse to said first plane, said handle, when in said second condition, being usable to rotate the second sub-housing relative to the first sub-housing.

16. A cable housing device for releasably storing an electric cable, comprising a housing which extends in a first plane and which comprises a first sub-housing and a second sub-housing around which the first sub-housing extends; the second sub-housing comprising hub means upon which the cable can be releasably wound, the first sub-housing and the second sub-housing being operatively associated with each other such that the second sub-housing is capable of rotational movement relative to the first sub-housing; said hub means comprising end plates at respective axial ends of said hub means and the distance between the end plates being just greater that the diameter of the cable, thereby enabling the wound cable to be uniplanar within the device.

* * * * *